United States Patent
Chatroux et al.

(10) Patent No.: US 10,290,886 B2
(45) Date of Patent: May 14, 2019

(54) LEAK DETECTION ON A HIGH-TEMPERATURE FUEL CELL OR ELECTROLYZER

(71) Applicant: COMMISSARIAT A L'ENERGIE ATOMIQUE ET AUX ENERGIES ALTERNATIVES, Paris (FR)

(72) Inventors: André Chatroux, Tullins (FR); Thomas Donnier-Marechal, Grenoble (FR)

(73) Assignee: Commissariat a l'Energie Atomique et aux Energies Alternatives (FR)

( * ) Notice: Subject to any disclaimer, the term of this patent is extended or adjusted under 35 U.S.C. 154(b) by 0 days.

(21) Appl. No.: 15/559,789

(22) PCT Filed: Mar. 14, 2016

(86) PCT No.: PCT/FR2016/050555
§ 371 (c)(1),
(2) Date: Sep. 19, 2017

(87) PCT Pub. No.: WO2016/146923
PCT Pub. Date: Sep. 22, 2016

(65) Prior Publication Data
US 2018/0069253 A1 Mar. 8, 2018

(30) Foreign Application Priority Data
Mar. 19, 2015 (FR) ...................................... 15 52252

(51) Int. Cl.
*H01M 8/04* (2016.01)
*H01M 8/12* (2016.01)
(Continued)

(52) U.S. Cl.
CPC ........... *H01M 8/04679* (2013.01); *C25B 1/08* (2013.01); *C25B 1/10* (2013.01); *C25B 9/08* (2013.01);
(Continued)

(58) Field of Classification Search
CPC .... C25B 1/08; C25B 1/10; C25B 9/08; C25B 9/20; C25B 15/02; C25B 15/08;
(Continued)

(56) References Cited

U.S. PATENT DOCUMENTS

2007/0065711 A1* 3/2007 Gopal ............... H01M 8/04014
429/415
2007/0111058 A1* 5/2007 Yoshida ............ H01M 8/04223
429/408

FOREIGN PATENT DOCUMENTS

FR 2957360 A1 9/2011
FR 3001789 A1 8/2014
(Continued)

Primary Examiner — Ciel P Thomas
(74) Attorney, Agent, or Firm — Forge IP, PLLC

(57) ABSTRACT

An electrochemical system includes an electrochemical device having a stack of elementary electrochemical cells each including an electrolyte interposed between a cathode and an anode; ducts for supplying the anodes and the cathodes with gas and for collecting the gases generated by the latter; an enclosure having the electrochemical device housed therein and including at least one inlet duct and one outlet duct to circulate an air flow in the enclosure; and a circuit for analyzing the air in the enclosure. The circuit includes a sensor capable of measuring an oxygen content present in the outlet duct of the enclosure; and an analysis unit capable of diagnosing a leak of the device when the measured oxygen content differs from a predetermined oxygen content in the inlet duct of the enclosure.

4 Claims, 2 Drawing Sheets

(51) Int. Cl.
    C25B 1/08       (2006.01)
    C25B 1/10       (2006.01)
    C25B 9/08       (2006.01)
    C25B 9/20       (2006.01)
    C25B 15/02      (2006.01)
    C25B 15/08      (2006.01)
    H01M 8/24       (2016.01)
    H01M 8/18       (2006.01)
    H01M 8/04664    (2016.01)
    H01M 8/2425     (2016.01)
    H01M 8/0444     (2016.01)
    H01M 8/1231     (2016.01)
    H01M 8/04082    (2016.01)
    H01M 8/04291    (2016.01)
    H01M 8/2475     (2016.01)
    H01M 8/247      (2016.01)
    H01M 8/124      (2016.01)

(52) U.S. Cl.
    CPC ............... *C25B 9/20* (2013.01); *C25B 9/206* (2013.01); *C25B 15/02* (2013.01); *C25B 15/08* (2013.01); *H01M 8/0444* (2013.01); *H01M 8/04201* (2013.01); *H01M 8/04291* (2013.01); *H01M 8/1231* (2016.02); *H01M 8/2425* (2013.01); *H01M 8/2475* (2013.01); *H01M 8/186* (2013.01); *H01M 8/247* (2013.01); *H01M 2008/1293* (2013.01); *Y02E 60/366* (2013.01); *Y02E 60/528* (2013.01)

(58) Field of Classification Search
    CPC ......... H01M 8/04201; H01M 8/04291; H01M 8/0444; H01M 8/04679; H01M 8/1231; H01M 8/2425; H01M 8/2475; H01M 2008/1293; Y02E 60/366; Y02E 60/528
    See application file for complete search history.

(56) References Cited

FOREIGN PATENT DOCUMENTS

| | | |
|---|---|---|
| JP | 2006253096 A | 9/2006 |
| JP | 2013161754 A | 8/2013 |
| WO | 2011110676 A1 | 9/2011 |
| WO | WO-2013038051 A1 * | 3/2013 ........ H01M 8/04014 |

* cited by examiner

LEAK DETECTION ON A HIGH-TEMPERATURE FUEL CELL OR ELECTROLYZER

FIELD OF THE INVENTION

The invention relates to high-temperature electrochemical devices, such as solid oxide electrolyzers and fuel cells, and more particularly to the detection of a gas leak on the stack of electrochemical cells in the hot area.

BACKGROUND OF THE INVENTION

As known per se, an electrolyzer of water vapor ($H_2O$) at high temperature, or HTSE (high-temperature steam electrolysis) electrolyzer, comprises a stack of a plurality of elementary solid oxide electrochemical cells. Referring to FIG. 1, a solid oxide cell or "SOC" 10 particularly comprises:
a) a first porous conductive electrode 12, or "cathode", intended to be supplied with water vapor for the production of hydrogen,
b) a second porous conductive electrode 14 or "anode", through which the oxygen ($O_2$) generated by the electrolysis of the water injected onto the cathode escapes, and
c) a solid oxide (dense electrolyte) membrane 16 sandwiched between cathode 12 and anode 14, membrane 16 being an anion conductor for high temperatures, usually temperatures higher than 600° C.

Heating cell 10 at least up to this temperature and injecting an electric current/between cathode 12 and anode 14 causes a reduction of the water on cathode 12, which generates hydrogen ($H_2$) at the level of cathode 12 and oxygen at the level of anode 14.

A stack 20 of such cells, aiming at producing a significant quantity of hydrogen, is illustrated in the simplified view of FIG. 2. In particular, cells 10 are stacked on one another while being separated by interconnection plates 18. Such plates have the double function of ensuring the electric continuity between the different electrodes of cells 10, thus allowing the electrical serializing thereof, and of distributing the different gases necessary for the cell operation, as well as, possibly, a carrier gas for helping the draining off of the products of the electrolysis. To achieve this, plates 18 are connected to a water vapor supply 22 for the injection of this vapor onto the cathodes of cells 10 in accordance with a constant water vapor flow rate $D_{H_2O}$, determined by a controllable valve 24. Plates 18 are also connected to a gas collector 26 for the collection of the gases originating from the electrolysis. An example of a stack and of an interconnection plate structure is for example described in document WO 2011/110676.

Such an electrolyzer may also operate in co-electrolysis, that is, with a gas mixture at the cathode input formed of water vapor ($H_2O$) and of carbon dioxide ($CO_2$). The mixture at the anode output is then formed of hydrogen ($H_2$), of water vapor ($H_2O$), of carbon monoxide (CO), and of carbon dioxide ($CO_2$).

For the effective implementation of the electrolysis by stack 20, the stack is taken to a temperature greater than 600° C., usually a temperature in the range from 650° C. to 900° C., the gas supply is started at a constant flow rate and an electric power source 28 is connected between two terminals 30, 32 of stack 20 to have a current/flow therethrough.

The tightness between solid oxide cells 10 and interconnection plates 18 is usually achieved by seals which are one of the weak points of the system. Such seals ensuring the tightness of stack 20 towards the atmosphere of the hot area are fragile and may allow the leaking of:
hydrogen and water vapor if the leak is located on the cathode side, and/or
oxygen if the leak is located on the anode side.

However, due to the high temperature of the electrolyzer, there exists around it an area having a temperature close to the temperature of the stack, and thus an area capable of reaching temperatures higher than 650° C. Now, such temperatures are higher than the self-ignition temperature of hydrogen (571° C.). The area around the electrolyzer where the temperatures are sufficient for the self-ignition of fuels is usually called "hot area". It generally corresponds to the thermally-insulated enclosure containing the electrochemical device. With no specific security measure, there thus is a risk of fire, or even of explosion, if the leaks cause an accumulation of hydrogen close to the electrolyzer. To guarantee the security regarding the risk of explosion, the hot area is usually swept with an air flow sufficient to achieve the combustion of any fuel gas leak and avoid the accumulation of hydrogen. Particularly, the enclosure having the electrolyzer housed therein comprises an inlet having air injected therethrough, and an air outlet, which thus enables to circulate the air in the enclosure and thus regularly renew its content. Thus, fuel gas is never accumulated and there is no risk of explosion. However, such a solution imposes a very high flow rate of air, which has to be preheated to the enclosure temperature to avoid cooling the electrolyzer, this being particularly disadvantageous in terms of power efficiency.

Even though such measures avoid the risk of explosion, they do not enable per se to detect a leak of the electrolyzer, and accordingly, they do not enable to warn the user of the electrolyzer or to implement an automatic disabling of the electrolyzer. Several leak detection systems have been developed for this purpose.

A first solution is based on the exothermicity of the reaction of combustion of the hydrogen having leaked from the electrolyzer, which reaction provides a flame at more than 2,000° C., which causes a rise in the temperature of the hot area. In practice, one (or a plurality of) temperature sensor(s) is (are) thus arranged in the enclosure housing the electrolyzer to measure the temperature in the hot area. An electronic package may thus be connected to the temperature sensor(s) and automatically turn off the electrolyzer when the measured temperature exceeds a predetermine detection threshold. Such a solution however has a low accuracy. Indeed, a same temperature increase of a thermocouple in the hot area may be due to the radiation of the hydrogen flame of a small leak close to the thermocouple or of a strong leak distant from the thermocouple. To avoid an erroneous leak detection, the detection threshold is thus oversized, which thus amounts to only detecting strong hydrogen leaks.

A second solution comprises placing in the enclosure a hydrogen detector, or a hydrogen explosimeter, to measure the hydrogen content of the gas sweeping the hot area, and thus detect a hydrogen leak. However, hydrogen sensors do not operate beyond a given temperature, and particularly the temperatures of a hot area of an electrolyzer. The hydrogen sensor is accordingly placed in a cooler area, placed downstream of the hot area in terms of air flow. An analysis of the signal supplied by the hydrogen detector can then be performed to determine whether the measurement exceeds a threshold requiring placing the electrolysis system in safe conditions. However, the combustion of hydrogen essentially occurs in the hot area, so that the sensor can only detect a minute portion, or even none, of the hydrogen if the leak is small. Indeed, only a strong hydrogen leak, resulting in the total consumption of the oxygen, induces a detectable presence of hydrogen at the sensor level. Only a strong hydrogen leak can thus be detected.

Sensors capable of operating directly in the hot area have been developed. However, they do not provide a real advantage since they only detect the hydrogen which has not burnt in the sweeping air, which again corresponds to the case of a strong leak.

Further, the developed solutions aim at a direct or indirect detection of a hydrogen leak. They thus do not enable to detect an oxygen leak on the anode side of the electrolyzer.

In other words, there exists no solution in the state of the art enabling to detect a leakage both on the cathode side and on the anode side of a HTSE electrolyzer, and which is capable of detecting small leaks.

A high-temperature solid oxide fuel cell, better known as a SOFC, has similar problems. Indeed, a HTSE electrolyzer and a SOFC are identical structures, only their operating modes being different. Referring to FIG. 3, an electrochemical cell forming a SOFC comprises the same elements (anode 12, cathode 14, electrolyte 16) as an electrolyzer cell, the fuel cell being however supplied, with constant flow rates, on its anode with hydrogen (or another fuel such as methane $CH_4$) and on its cathode with oxygen (contained in the sent air) and connected to a load C to deliver the generated electric current.

In the same way as a HTSE electrolyzer, a SOFC comprises a stack of such electrochemical cells separated by interconnection plates for their electric connection and the distribution/collection of gases, which stack may have tightness issues. The cell also comprises a hot area usually submitted to an air sweeping to avoid the accumulation of fuel.

When the stack of the high-temperature fuel cell is tight, in the same way as previously, the seals providing the tightness of the stack in the hot area are fragile and may allow a leaking of:

the fuel ($H_2$, $CH_4$, . . . ) if the leak is located on the anode side, and/or the depleted air if the leak is located on the cathode side.

In the same way as previously, in the state of the art, only a detection of the hydrogen leak has been developed, more particularly based on a hydrogen detector or on an explosimeter to analyze the gas sweeping the hot area, as described previously.

In other words, there exists no solution either enabling to detect a leak both on the cathode side and on the anode side of a SOFC in the state of the art. Further, there exists no solution capable of detecting small leaks.

SUMMARY OF THE INVENTION

The present invention aims at providing a system for detecting a leak in a HTSE electrolyzer or a SOFC, whatever the anode or cathode side where the leak is located.

For this purpose, the invention aims at an electrochemical system comprising:

an electrochemical device forming a high-temperature steam electrolyzer or a high-temperature fuel cell, the device comprising:

a stack of elementary electrochemical cells, each comprising an electrolyte interposed between a cathode and an anode;

ducts for supplying the anodes and the cathodes with gas and for collecting gases produced by the latter;

an enclosure having the electrochemical device housed therein and comprising at least one inlet duct and one outlet duct to circulate an air flow in the enclosure; and a circuit for analyzing the air in the enclosure.

According to the invention, the circuit for analyzing the air in the enclosure comprises:

a sensor capable of measuring an oxygen content $\tau_1$ present in the outlet duct of the enclosure; and an analysis unit capable of diagnosing a leak of the device when the measured oxygen content $\tau_1$ differs from a predetermined oxygen content $\tau_0$ in the inlet duct of the enclosure.

The invention provides using an oxygen sensor measuring the oxygen content of air coming out of the hot area to detect a leak of the electrolyzer or of the fuel cell.

For the case of a high-temperature electrolyzer supplied with water vapor ($H_2O$), value $\tau_1$ of the oxygen content measured in the absence of a leak in the sweeping air coming out of the hot area is normally equal to that of the air injected into the enclosure.

If the measured value $\tau_1$ differs from the value at the inlet $\tau_0$, this necessarily means the presence of a leak. In particular, if the oxygen detector indicates a value $\tau_1 < \tau_0$, this means that part of the oxygen in the air of the hot area has been used as an oxidizer by a hydrogen leak, that is, there is a leak on the cathode side.

Conversely, if the oxygen detector indicates a value $\tau_1 > \tau_0$, this means that part of the oxygen generated by the electrolysis reaction leaks into the air of the hot area, that is, the leak is located on the anode side. A leak is thus detected, whether it takes place on the anode side or on the cathode side of the electrolyzer.

Similarly, for the case of a high-temperature co-electrolyzer supplied with a mixture of water vapor ($H_2O$) and, for example, of carbon dioxide ($CO_2$), if the oxygen detector indicates a value $\tau_1 < \tau_0$, this means that part of the oxygen in the air of the hot area has been used as an oxidizer by a hydrogen or carbon monoxide leak, that is, there is a leak on the cathode side. It should further be noted that carbon monoxide, which is the product of the co-electrolysis, also undergoes a self-ignition in the hot area, its self-ignition temperature being indeed equal to 605° C. The invention thus also enables to detect a carbon monoxide leak, or at least consequences thereof, conversely to solutions only targeting hydrogen detection.

Conversely, if the oxygen detector indicates a value $\tau_1 > \tau_0$, this means that part of the oxygen generated by the co-electrolysis reaction leaks into the air of the hot area, that is, the leak is located on the anode side. Here again, a leak is thus detected, whether it takes place on the anode side or on the cathode side of the electrolyzer.

For the case of a high-temperature fuel cell supplied with a fuel gas ($H_2$ or $CH_4$ for example), if the measured value $\tau_1$ differs from the initial value $\tau_0$, this also necessarily means the presence of a leak in the cell. Indeed, when the oxygen detection indicates a measured value $\tau_1 < \tau_0$, this may mean that part of the oxygen in the air of the hot area has been used as an oxidizer by a hydrogen or methane leak, that is, that there is a leak on the anode side, or this may mean the presence of depleted air which mixes with the sweeping air, that is, the leak is located on the cathode side. In fuel cell mode, unless it is supplied with pure oxygen or with enriched air, the oxygen detector will never indicate a value greater than $\tau_0$. It is however nevertheless remarkable that the use of an oxygen detector is a way to diagnose a seal failure in a high-temperature fuel cell, on the anode side as well as on the cathode side.

For the case of a reversible system, fuel cell and high-temperature electrolyzer, the use of an oxygen detector thus enables to detect a leak on the anode or cathode side in the hot area with the advantage of enabling to identify the defective side in electrolysis mode.

Further, the oxygen sensor is advantageously positioned in the cold area, which enables to use a wide range of sensors. Further, since it is performed outside of the hot area, the measurement is not disturbed by local phenomena which take place therein (convection, for example) and the measurement is independent from the accurate location when the combustion is taking place. Indeed, the accuracy of the detection is independent from the hot area and from the actual combustion phenomenon, which thus eases the detection of small leaks. For example, even with $\tau_0$ equal to the average oxygen value observed in the air (20.95% at the sea level, that is, at the "atmospheric pressure"), an accurate detection is obtained.

Further, the invention can be applied whether the electrolyzer or the cell operates at the atmospheric pressure or at higher pressures. In this last case, the oxygen detector may even be advantageously positioned in a portion at the atmospheric pressure. The analysis is then performed on the gas coming out of the hot area, preferably after an expansion at the atmospheric pressure.

The invention efficiently works when the enclosure is tight around the electrochemical device. However, the tightness of the enclosure is not an essential characteristic since it is sufficient for part of the gas generated by the electrochemical device to be captured by the analysis circuit to determine whether the electrochemical device leaks. Preferably, the enclosure is configured so that at least 50% of the gases originating from the electrochemical device in the occurrence of a leak are captured by the analysis circuit. More preferably still, the enclosure is configured so that at least 90% of the gases originating from the electrochemical device in the occurrence of a leak are captured by the analysis circuit.

According to an embodiment, the analysis circuit comprises a pumping unit capable of pumping air from the outlet duct and of generating an air flow having a predetermined maximum volume flow rate, and the oxygen sensor measures the oxygen content downstream of the pumping unit. In other words, certain oxygen sensors operate in a predetermined speed range of the analyzed gases. The pumping unit particularly enables to sample gas and to generate a flow compatible with the sensor in the case where the air flow in the enclosure is too strong to place the oxygen sensor directly in the air flow.

According to an embodiment, the analysis circuit comprises a drying unit for drying air present in the outlet duct of the enclosure, and the sensor measures the oxygen content of the air dried by the drying unit. In other words, the drying unit, for example, a droplet separator, keeps the water content in the gas analyzed by the sensor within a preferred operating range of oxygen sensors. This is in particular what is recommended by liquid electrolyte electrochemical sensor suppliers.

According to an embodiment:
the device is a high-temperature electrolyzer,
the analysis unit diagnoses a leak at the level of the electrolyzer cathodes when $\tau_1 < \tau_0$ and diagnoses a leak at the level of the anodes of the electrolyzer anodes when $\tau_1 > \tau_0$.

In other words, as previously described, the invention also enables to accurately detect the failing side of the electrolyzer.

Preferably, the analysis unit is capable of determining a gas leak flow rate at the level of the cathodes of the electrolyzer according to the following relation:

$$D_{fH2} = 2 \cdot (\tau_0 - \tau_1) \cdot D_{air}$$

in which expression $D_{fH2}$ is said leak flow rate and $D_{Air}$ is the air flow rate in the enclosure.

In other words, the invention is capable of estimating the electrolyzer fuel leak flow rate, that is, the flow rate of the most dangerous gases. This particularly enables to verify whether the leak is tolerable in terms of security, that is, whether all the fuel is effectively burnt within the enclosure with no risk of accumulation in the cold area. Further, from an economical viewpoint, the estimation of the leak enables to determine whether the production loss is acceptable.

BRIEF DESCRIPTION OF THE DRAWINGS

The present invention will be better understood on reading of the following description provided as an example only in relation with the accompanying drawings, where the same reference numerals designate the same or similar elements, among which.

DETAILED DESCRIPTION OF THE INVENTION

In the following, terms "upstream" and "downstream" designate locations in ducts and bypasses according to the gas circulation therein.

Figure 1:
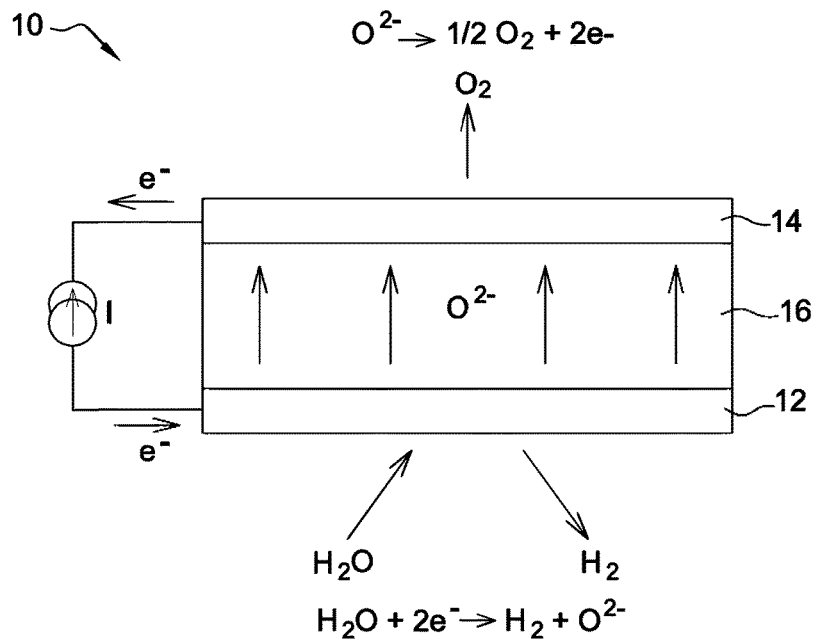
FIG. 1 is a simplified view of an elementary electrochemical cell of an HTSE electrolyzer.
Figure 2:
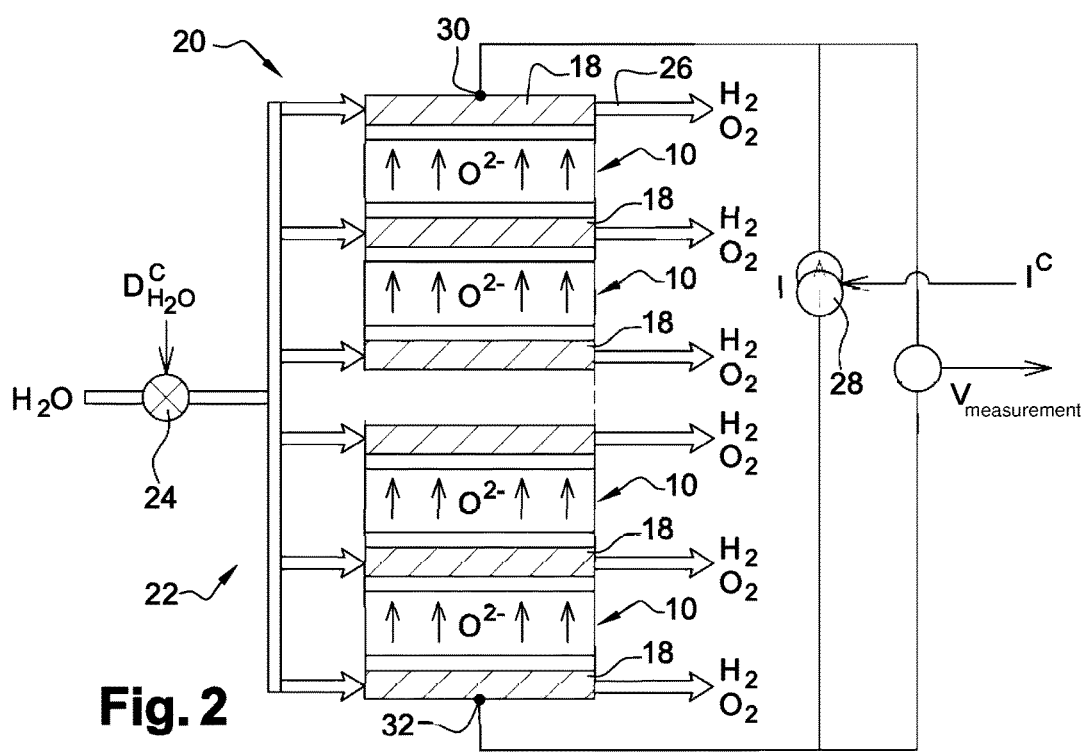
FIG. 2 is a simplified view of a stack of cells according to FIG. 1.
Figure 3:
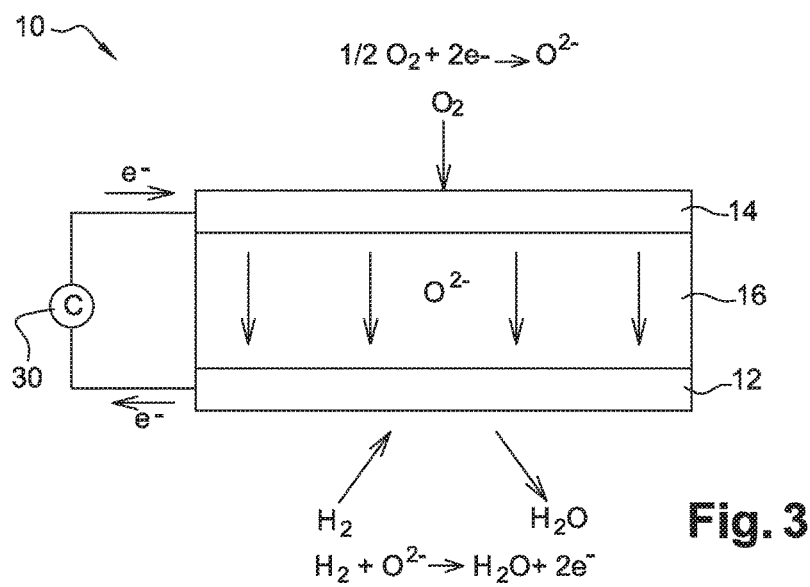
FIG. 3 is a simplified view of an electrochemical cell of a SOFC.
Figure 4:
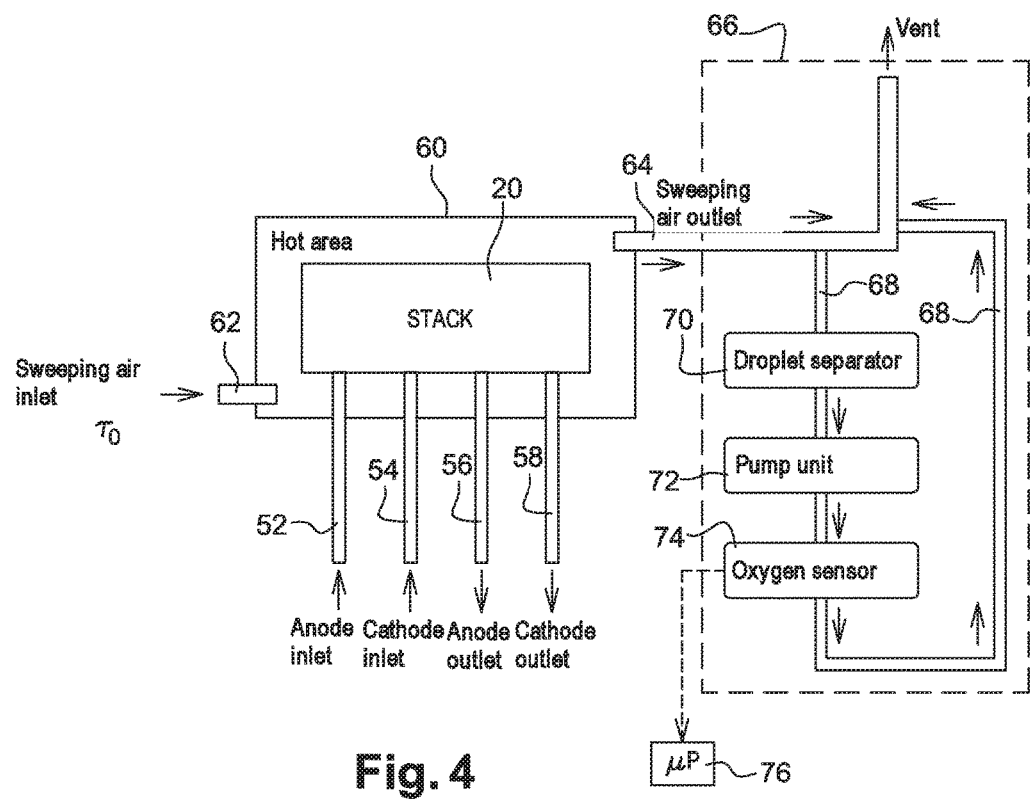
FIG. 4 is a simplified view of an electrochemical system according to the invention including a hot area, the gas inlet and outlet circuits, and the measuring chain incorporating an oxygen detector.

Referring to FIG. 4, the system according to the invention comprises:
an HTSE electrolyzer 20, for example, that described in relation with FIGS. 1 and 2 and comprising an assembly of ducts 52, 54, 56, 58 for the supply and the collection of the gases of the anodes and of the cathodes of the electrochemical cells of the electrolyzer
an enclosure 60 having electrolyzer 20 housed therein, ducts 52, 54, 56, 58 crossing a wall of enclosure 60 for their connection to gas supply and collection circuits (not shown). Enclosure 60 also comprises an air inlet duct 62 and an air outlet duct 64, enclosure 60 for example being gas- and liquid-tight everywhere else. Duct 62 is capable of being connected to an air supply circuit (not shown) to apply an sweeping with air of the hot area surrounding electrolyzer 20, the sweeping air being discharged through outlet duct 64; and
an air analysis device 66 connected to outlet duct 64 of enclosure 60.

Analysis device 66 comprises:
a bypass loop 68 of the outlet duct 64 enabling to sample gas from outlet duct 64 and to inject back the gas sampled therefrom downstream of the sampling;
a drying unit, particularly, a droplet separator 70, to remove water present in the gas flowing through bypass 68;

a pumping unit 72, arranged downstream of droplet separator 70, to sample, therethrough, gas from outlet duct 64;

an oxygen sensor 74, arranged downstream of pumping unit 70 and measuring the oxygen content delivered by the latter, and accordingly the oxygen content of the gas $\tau_1$ present in outlet duct 64; and an analysis unit 76 connected to the oxygen sensor to receive the measured content $\tau_1$ and implement a processing of this content to detect a leak of electrolyzer 20.

For example, the sweeping air injected into the enclosure is air sampled outside, and accordingly having at the atmospheric pressure an oxygen content close to 20.95% and oxygen sensor 74 has a measurement range from 0% to 25% of $O_2$, for example, an oxymeter such as used for oxygen deficiency monitoring. The sensor is for example a Dräger detection system, that is, the "Polytron 7000 Transmitter" with a O2 LS sensor (3-electrode temperature-compensated electrochemical sensor).

The sweeping air flow $D_{Air}$ (l/min) introduced into enclosure 60 through inlet duct 62 ensures a renewal of N times per minute of the air contained in enclosure 60. Flow rate $D_{Air}$ is thus equal to:

$$D_{Air} = N \cdot V_{enclosure}$$

where $V_{enclosure}$ is the volume (in l) of enclosure 60.

According to the volume of enclosure 60 and to the selected number N of renewals, essentially dictated by security considerations, the sweeping air flow rate $D_{Air}$ may be too high for a direct analysis, for example, if the speed in the gas lines exceeds the maximum value recommended by the manufacturer of the oxygen sensor.

According to an embodiment taking into account the previous constraint, but also to guarantee that a gas flow always flows on the oxygen detector, pumping unit 72 is installed in series with the sensor in bypass 68. Pumping unit 72 is thus selected to generate a gas flow rate appropriate for the operation of sensor 74

Further, when a leak on the stack appears on the cathode side, a certain leak flow rate of gas mixture $H_2+H_2O$ enters into enclosure 60. There thus is an increase in the quantity of water vapor in the sweeping air, on the one hand directly originating from the cathode mixture, and on the other hand after the combustion of hydrogen with the oxygen of the sweeping air. Since the temperature in outlet duct 64 is lower than that in enclosure 60, or even equal to the room temperature, the water vapor risks condensing on the wall of duct 64 and bypass duct 68. According to an embodiment enabling to protect oxygen sensor 74 from possible water drops, and thus to respect the recommendations of the manufacturer regarding the maximum humidity content of the analyzed air, droplet separator 70 is installed in series with and upstream of the oxygen sensor in bypass 68.

According to the previous example, corresponding to a leak on the cathode side, the combustion of hydrogen with the oxygen of the sweeping air will cause a decrease in the oxygen content in the air analyzed by sensor 74. The latter being calibrated in the range corresponding to the atmospheric air, it may provide a measurement within a typical range from 0% to 25% of oxygen in the analyzed air. The standard oxygen content being $\tau_0=20.95\%$ and thus corresponding to the oxygen content introduced into enclosure 60, a measurement $\tau_1$ of a value smaller than $\tau_0$ corresponds to a decrease in the oxygen content in the air, and thus reveals the existence of a leak on the cathode side of the stack. Particularly, analysis unit 76 stores value $\tau_0$ and compares measurement $\tau_1$ with value $\tau_0$ and diagnoses the leak on the cathode side if $\tau_1 < \tau_0$.

Within the measurement range of oxygen sensor 74, a quantification of the flow rate $D_{fH2}$ of a hydrogen leak $D_{fH2}$ is advantageously implemented by analysis unit 76 which stores value $D_{Air}$ according to the following relation:

$$D_{fH2} = 2 \cdot (\tau_0 - \tau_1) \cdot D_{Air}$$

Further, if the leak is located on the anode side, part of the anode mixture of oxygen-enriched air enters into enclosure 60, which causes an increase in the oxygen content in the gas analyzed by sensor 74. Thus, analysis unit 76 diagnoses the leak on the anode side if $\tau_1 > \tau_0$.

According to an embodiment, warning and/or alarm thresholds may be established and cause automatic actions on the electrolyzer control. For example, analysis unit 76 is capable of stopping the gas and current supply of the electrolyzer.

An application of the invention to a high-temperature water vapor electrolyzer has been described. The invention also applies to a high-temperature co-electrolyzer supplied with a mixture of water vapor ($H_2O$) and of carbon dioxide ($CO_2$) and generating a mixture of hydrogen ($H_2$) and of carbon monoxide (CO). In this case, the same lines of reasoning and formulas as previously should be applied, replacing the notion of hydrogen leak flow rate $D_{fH2}$ with the notion of fuel gas $H_2+CO$ leak flow rate $D_{fH2CO}$.

The invention also applies to a high-temperature solid oxide fuel cell formed of a stack of electrochemical elementary cells, such as previously described.

In such a case, a leak on the fuel side or on the depleted air side results in both cases in a measured oxygen content lower than the oxygen content of the sweeping air. Analysis unit 76 thus diagnoses a leak as soon as $\tau_1 \neq \tau_0$.

The invention applies to a reversible system, fuel cell and high-temperature electrolyzer. The use of an oxygen detector enables to detect a leak on the anode or cathode side in the hot area, with the advantage of allowing the identification of the defective side in electrolysis mode.

The invention applies to previously-described systems operating at the atmospheric pressure, but also on pressurized systems. The oxygen detector may advantageously remain at the atmospheric pressure. The analysis is then performed on the gas coming out of the hot area, preferably after an expansion at the atmospheric pressure.

Embodiments where the oxygen content of the air injected into the enclosure is a given constant quantity $\tau_0$, for example, the oxygen of air at the atmospheric pressure when air is injected, have been described. As a variation, oxygen content $\tau_0$ is measured to increase the accuracy of the detection, for example by arranging a device similar to elements 68, 70, 72, and 74 in the inlet duct. The second oxygen sensor is then connected to analysis unit 76 to deliver its measurement thereto.

Comparisons (greater, smaller, different) between two values have been described. In a variation, the implemented comparisons use thresholds, a leak being detected when the oxygen content at the outlet $\tau_1$ differs from the initial oxygen content $\tau_0$ by more than a predetermined value, for example, that corresponding to the maximum hydrogen leak flow rate acceptable from an economical point of view. In a variation, different thresholds are applied according to the nature of the leak.

An analysis device comprising a bypass and a pumping unit has been described. Such a configuration makes the oxygen measurement insensitive to the value of the sweeping air flow rate in the outlet duct of the enclosure, and thus allows a measurement, including for flow rates to strong for an oxygen measurement directly in the outlet duct. As a variation, if the sweeping air flow rate allows a direct measurement in the outlet duct, the measurement device comprises a sensor therein, optionally downstream of a droplet separator.

The invention claimed is:

1. An electrochemical system comprising:
   an electrochemical device forming a high-temperature steam electrolyzer or high-temperature fuel cell, the device comprising:
   a stack of elementary electrochemical cells each comprising an electrolyte interposed between a cathode and an anode;
   ducts for supplying the anodes and the cathodes with gas and for collecting the gases generated by said anodes and cathodes;
   an enclosure having the electrochemical device housed therein and comprising at least one inlet duct and one outlet duct to circulate an air flow in the enclosure; and
   a circuit for analyzing the air in the enclosure;
   wherein the circuit for analyzing the air in the enclosure comprises:
   a sensor that measures an oxygen content present in the at least one outlet duct of the enclosure; and
   an analysis unit that diagnoses a leak of the electrochemical device when the measured oxygen content differs from a predetermined oxygen content in the at least one inlet duct of the enclosure;
   wherein the analysis unit comprises a computer-readable medium comprising instructions, which when executed by the analysis unit, cause the analysis unit to determine a leak flow rate at the level of the electrolyzer cathodes according to the following relation:

$$D_{fH2} = 2 \cdot (\tau_0 - \tau_1) \cdot D_{Air}$$

in which expression $D_{fH2}$ is said leak flow rate, $D_{Air}$ is the air flow in the enclosure, $\tau_0$ is the predetermined oxygen content in the at least one inlet duct of the enclosure, and $\tau_1$ is the measured oxygen content in the at least one outlet duct of the enclosure.

2. The electrochemical system of claim 1, wherein the analysis circuit comprises a pumping unit capable of pumping air from the at least one outlet duct and of generating an air flow having a predetermined maximum volume flow rate, and wherein the oxygen sensor measures the oxygen content downstream of the pumping unit.

3. The electrochemical system of claim 1, wherein the analysis circuit comprises a drying unit for drying air present in at least one the outlet duct of the enclosure, and wherein the oxygen sensor measures the oxygen content in the air dried by the drying unit.

4. The electrochemical system of claim 1, wherein the electrochemical device is a high-temperature electrolyzer, and wherein the analysis unit diagnoses a leak at the level of the electrolyzer cathodes when the measured oxygen content in the at least one outlet duct of the enclosure is inferior to the predetermined oxygen content in the at least one inlet duct of the enclosure, and/or diagnoses a leak at the level of the anodes of the device when the measured oxygen content in the at least one outlet duct of the enclosure is superior to the predetermined oxygen content in the at least one inlet duct of the enclosure.

* * * * *